Figure 1:
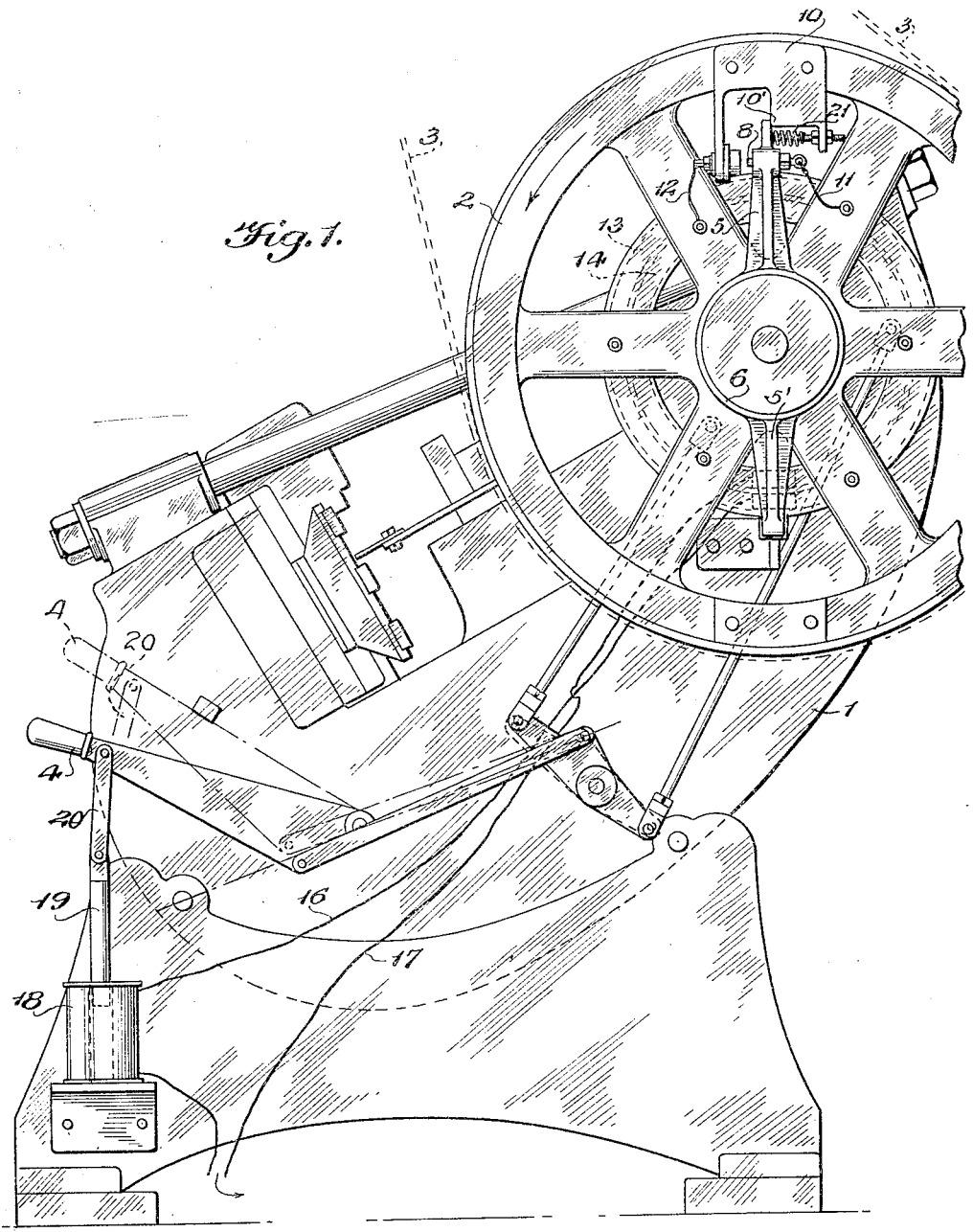

May 16, 1933.   J. J. WILLIAMS ET AL   1,909,156
AUTOMATIC CLUTCH THROW-OUT
Filed July 28, 1928   2 Sheets-Sheet 1

Inventors
J. J. Williams, and
D. M. Gray.

By
Eccleston & Eccleston.
Attorneys

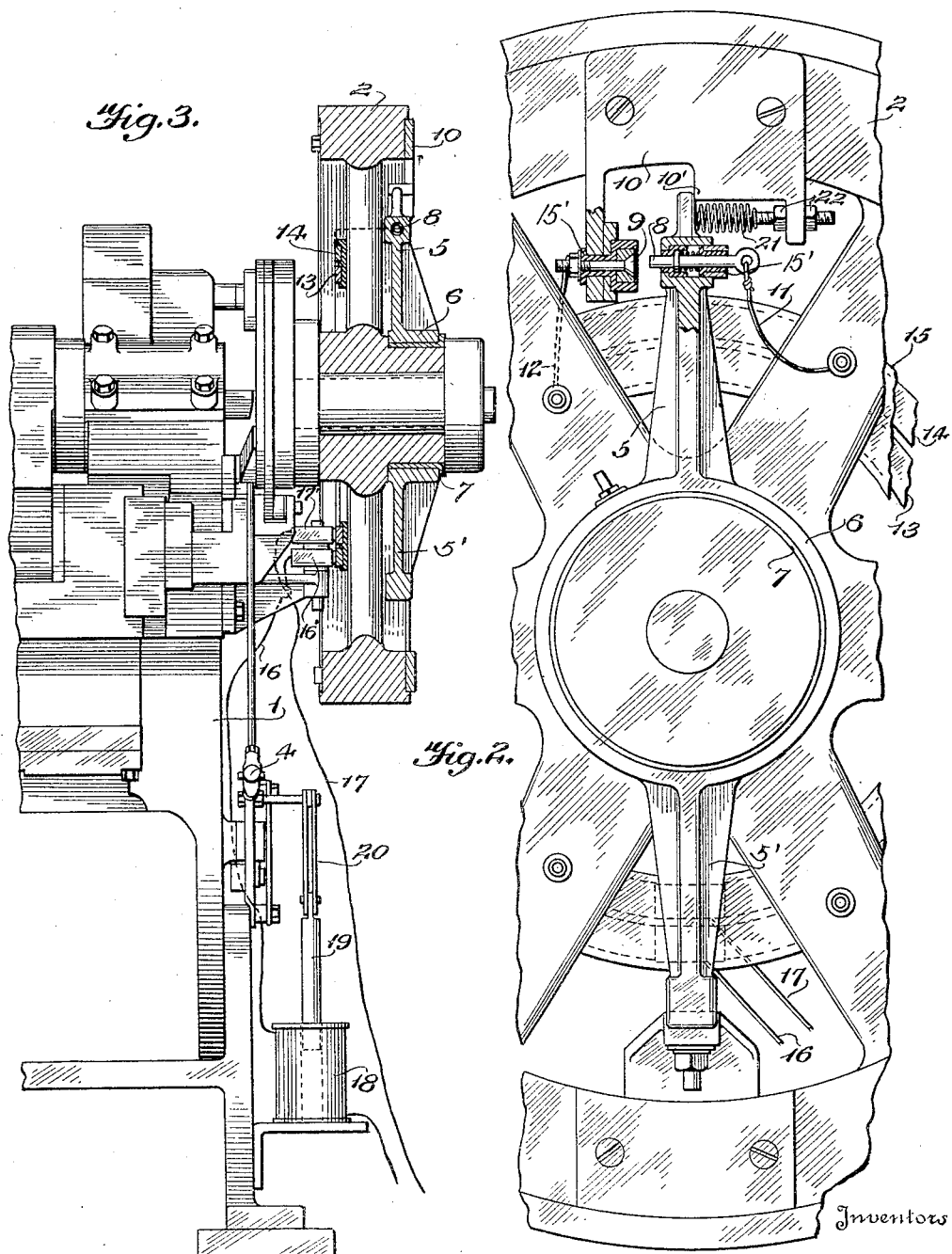

Patented May 16, 1933

1,909,156

UNITED STATES PATENT OFFICE

JOHN J. WILLIAMS AND DANIEL M. GRAY, OF WHEELING, WEST VIRGINIA, ASSIGNORS TO HAZEL-ATLAS GLASS CO., OF WHEELING, WEST VIRGINIA, A CORPORATION OF WEST VIRGINIA

AUTOMATIC CLUTCH THROW-OUT

Application filed July 28, 1928. Serial No. 295,939.

The present invention relates to machines in general but more particularly to machines known as stamping machines such as are used in forming metallic caps for bottles and the like.

In the use of such machines it very frequently happens that one of the articles will stick or jam in the die, and if the machine continues in operation after one of the articles has stuck then all of the succeeding articles will remain in the die until serious damage is done to the die or the press or both, due to the overload which is placed on the mechanism. Accordingly, it is an object of this invention to provide an automatic mechanism for use in conjunction with a stamping press or the like which will function to throw out the clutch or otherwise disconnect the source of power immediately upon the slowing down of the machine to a predetermined extent by reason of an overload or for any other reason.

A further object of the invention resides in the provision of such a device which may be readily adjusted so as to vary from a maximum to a minimum the amount of overload necessary to throw the press out of operation.

A further object of the invention consists in so simplifying the control of stamping presses as to permit of a single operator running a plurality of such machines rather than a single machine as under the present practice.

Other objects and advantages of the invention will be apparent from the following description when taken in connection with the accompanying drawings; in which Figure 1 is a side elevational view of a stamping press with our attachment applied thereto.

Figure 2 is an enlarged fragmentary elevational view of the flywheel of the press with the elements of the circuit closing mechanism shown in section; and Figure 3 is an end elevation of the press with the flywheel and automatic throw-out shown in section.

Referring to the drawings more specifically, the numeral 1 designates generally a stamping press provided with a flywheel 2 driven from a belt 3. The flywheel 2 drives the crankshaft of the press through the medium of any preferred type of clutch mechanism; but inasmuch as the present invention relates solely to the means for automatically throwing out the clutch, it is believed to be neither necessary nor desirable to enter into a detailed description of the press mechanism or the clutch other than to say that when the clutch handle 4 is in its lower position the clutch is thrown out of operation and the press is disconnected from the flywheel.

Mounted on the hub of the flywheel which is machined to serve as a bearing therefor, is a balanced weight 5—5' provided with an annular portion 6 which is mounted on the machined portion 7 of the hub of the flywheel 2. Carried by the weight 5 is a contact member 8 which is intended to close an electrical circuit in a manner hereinafter described by engagement with a contact member 9 mounted on a bracket 10 fixed to the rim of the flywheel 2.

The contact members 8 and 9 are connected by means of conductors 11 and 12 respectively with collector rings 13 and 14 which, as well as contacts 8 and 9, are insulated from the stamping press by insulating material 15 and 15' respectively. These collector rings are connected with a source of electric current by means of conductors 16 and 17 and commutator brushes 16' and 17', respectively. Associated with conductor 16 is a solenoid 18, the plunger 19 of which is connected by link 20 to the clutch operating handle or lever 4. This clutch is of the type which is releasably held in either its operative or inoperative position, and since the construction is well known, it need not be dwelt upon in detail.

The balanced weight 5 is, of course, mounted for rotation relative to the flywheel 2, but is normally caused to rotate therewith by reason of its engagement with a projection 10' on the bracket 10 which is fixed to the flywheel. A tension spring 21 has its respective ends connected to the weight 5 and bracket 10 and serves to resiliently hold these elements in engagement. By this construction, as will appear from an inspection of Figure 2, the contacts 8 and 9 are normally spaced apart but travel in unison about an annular path by reason of their connections with the bracket 10. The tension applied to spring 21 may be varied by means of the adjusting nuts 22 to vary between wide limits the extent of overload necessary to throw out the clutch as will appear more fully in the description of the operation of the mechanism.

As is well known, in stamping presses of the type with which the present invention is associated, the work done at each revolution of the crankshaft is not distributed evenly throughout the complete revolution but occurs suddenly at or near the end of the down stroke of the press plunger. Consequently there is a slight slowing down of the flywheel at each effective operation of the plunger, the extent of the slowing down and the suddenness with which it occurs being dependent upon the load placed upon the mechanism. It is this variation in the slowing down of the flywheel which is utilized to operate the present novel mechanism to throw out the clutch.

In the operation of the device the balanced weight 5 rotates with the flywheel 2 by reason of the engagement of the bracket 10 with the weight 5. As the flywheel slows down during one period of each of its revolutions the inertia of the balanced weight would cause it to continue to move at its regular rate of speed, and thus bring the electric contacts 8 and 9 together but for the fact that the tension on spring 21 is sufficient under normal operation of the machine to prevent this extent of relative movement between the balanced weight and the flywheel. However, when the maximum load for which the device is adjusted is exceeded, as for instance, when caps become jammed between the die and plunger, the slowing down of the flywheel becomes much more pronounced and the inertia of the balanced weight 5 will carry it forward and cause contact 8 to engage contact 9 on the flywheel, thereby closing the electrical circuit and sending a current through solenoid 18. This energizing of the solenoid will, of course, act to draw down its plunger 19 and the clutch lever 4 which is operatively connected thereto, with a consequence that the flywheel and plunger are promptly disconnected and damage to the mechanism, by reason of the clogging of the parts, prevented. The clutch will remain in this released position until manually moved to operative position by the handle 4. Just as soon as the clutch releases the flywheel from the main shaft of the press the flywheel is again free to take up its regular movement in accordance with the speed of the driving belt 3. The spring 21 will accordingly return the balanced weight to its position in contact with bracket 10, thereby opening the electrical circuit and releasing the clutch lever 4, so that it may be moved by the operator to starting position, it being understood, of course, that the operator has first relieved the die of the jammed caps or other obstructions.

It will be apparent to those skilled in the art that the present invention provides an exceedingly simple construction for automatically releasing an overloaded machine, that it is positive and reliable in operation, that its range of adjustment is such as to accommodate it to any conditions to which the machine may be subjected, that the release mechanism is promptly and automatically reset after each operation, and that its use will permit an operator to tend several presses instead of a single press as under the prior practice.

While we have described in considerable detail one form of construction which our invention may take it is intended that the present embodiment of the invention be considered as illustrative thereof rather than in a limiting sense, and that the specific structure disclosed herein is capable of wide variation without departing from the spirit of the invention.

Having fully described our invention, what we claim as new and desire to secure by Letters Patent is:

1. In a stamping press including a flywheel and a clutch associated therewith, inertia-controlled electrical means connected with said flywheel for throwing out the clutch upon the imposition of an overload on said press, said electrical means including a pair of contacts, and a spring normally holding said contacts apart.

2. In a stamping press including a flywheel and a clutch associated therewith, electrical means associated with said flywheel for throwing out the clutch upon the imposition of an overload on said press, said electrical means including a contact fixed to said flywheel, a cooperating contact, and a spring normally holding said contacts spaced apart.

3. In a stamping press including a flywheel and a clutch associated therewith, means for automatically throwing out said clutch upon the imposition of an overload on the press, said means including an electric circuit having a pair of relatively movable contacts connected with said flywheel and a solenoid in said circuit and operatively connected to said clutch.

4. In a stamping press including a flywheel and a clutch associated therewith, electrical means connected with said flywheel for throwing out the clutch upon the imposition of an overload on said press, said electrical means including a pair of contacts, a spring normally holding said contacts spaced apart, and means for varying the tension on said spring.

5. In a stamping press including a flywheel and a clutch associated therewith, means for automatically throwing out said clutch upon the imposition of an overload upon the press, said means including a rotatably mounted weight adapted to rotate with said flywheel, resilient means normally preventing relative movement between said weight and said flywheel, an electric circuit including a solenoid for throwing out said clutch, and contacts on said weight and said flywheel for closing said circuit upon a predetermined relative movement between the flywheel and weight.

6. In a stamping press including a flywheel and a clutch associated therewith, means for automatically throwing out said clutch upon the imposition of an overload upon the press, said means including a rotatably mounted weight adapted to rotate with said flywheel, a spring normally preventing relative movement between said weight and said flywheel, an electric circuit including a solenoid for throwing out said clutch, contacts on said weight and said flywheel for closing said circuit upon a predetermined relative movement between the flywheel and weight, and means for varying the tension on said spring.

7. A stamping press including a flywheel, a clutch associated therewith, a solenoid for operating the clutch in one direction, and inertia-controlled electrical means associated with the flywheel and responsive to the speed thereof to energize the solenoid upon the imposition of an overload on said press, said electrical means including a contact resiliently connected to the flywheel.

JOHN J. WILLIAMS.
DANIEL M. GRAY.